United States Patent [19]

Ueda

[11] Patent Number: 5,564,110

[45] Date of Patent: Oct. 8, 1996

[54] PRINTER INTERFACE APPARATUS WITH PLUG-IN UNIT AUTHORIZED FOR RECEPTION OF DATA UPON TYPE VERIFICATION

[75] Inventor: Shigeru Ueda, Wako, Japan

[73] Assignee: Canon Kabushiki Kaisha, Tokyo, Japan

[21] Appl. No.: 402,162

[22] Filed: Mar. 10, 1995

Related U.S. Application Data

[63] Continuation of Ser. No. 127,111, Sep. 27, 1993, abandoned, which is a continuation of Ser. No. 576,159, Aug. 30, 1990, abandoned, which is a continuation of Ser. No. 165,033, Mar. 7, 1989, abandoned.

[30] Foreign Application Priority Data

Mar. 10, 1987 [JP]  Japan .................................. 62-53090

[51] Int. Cl.[6] ................................................ G06F 15/177
[52] U.S. Cl. ........................ 395/828; 395/101; 395/282; 395/284; 395/835; 395/836; 395/849
[58] Field of Search ................................ 395/835, 836, 395/849, 828, 282, 284, 101

[56] References Cited

U.S. PATENT DOCUMENTS 3,979,732  9/1976  Hepworth et al. ...................... 395/288
3,986,169  10/1976  Kobayashi et al. ................. 340/825.52
4,268,901  5/1981  Subrizi et al. ........................... 395/284
4,589,063  5/1986  Shah et al. .............................. 395/828
4,634,845  1/1987  Hale et al. .............................. 235/380
4,649,514  3/1987  Berger ..................................... 395/282
4,660,141  4/1987  Ceccon et al. ......................... 395/829
4,701,878  10/1987  Günkel et al. ......................... 395/282
4,727,475  2/1988  Kiremidjian ............................ 395/284
4,750,136  6/1988  Arpin et al. ............................. 364/514
4,803,623  2/1989  Klashka et al. ........................ 395/828

*Primary Examiner*—Ken S. Kim
*Attorney, Agent, or Firm*—Fitzpatrick, Cella, Harper & Scinto

[57] ABSTRACT

An input/output device comprises a first controller for controlling input/output of information, an interface provided between the first controller and an information exchange unit, and a receiver for receiving data inherent to the interface from the interface. A discriminator discriminates whether data received by the receiver is one registered in the first controller, and a second controller inhibits the exchange of information between the interface and the first controller when the discriminator discriminates that the data received by the receiver is not one registered in the first controller.

20 Claims, 3 Drawing Sheets

PRINTER INTERFACE APPARATUS WITH PLUG-IN UNIT AUTHORIZED FOR RECEPTION OF DATA UPON TYPE VERIFICATION

This application is a continuation of application Ser. No. 08/127,111 filed on Sep. 27, 1993, now abandoned, which is a continuation of application Ser. No. 07/576,159 filed on Aug. 30, 1990, now abandoned, which is a continuation of application Ser. No. 07/165,033 filed on Mar. 7, 1988, now abandoned.

BACKGROUND OF THE INVENTION

1. Field of the Invention

The present invention relates to an input/output device having a function to detect a type of a loaded interface board or the like.

2. Related Background Art

Conventional input/output devices having a function to detect an option board (expansion interface board) are classified into the following two types.

(1) a 3-bit signal line is used as an interface board detection signal line and a type of the option board is detected by "0" and "1" bits of the signal line. For example, "000" represents a serial interface, "001" represents a parallel interface, and "111" represents that no option board is loaded in the device.

(2) a 1-bit signal line for indicating the presence or absence of a card is provided as an interface board detection signal line. When the bit is "0", it represents that the option board is loaded in the device, and when the bit is "1", it represents that the option board is not loaded. If the option board is in the device, information indicating a type of card is detected from the data bus.

In each of the above devices, however, at least one card detection signal line is required, because if data is input from the option board while the card is not loaded, there is no response from the option board and a controller board waits for the response and is hung up. In order to prevent such a hang-up, it is necessary to detect the presence or absence of the card.

Besides the input/output devices described above, the presence or absence of the board may be detected by limiting the response time from the option board.

However, in order to comply with interfaces having various access time, the response time from the option board must be set to be long. Such a long response time is needed, for example, where a physical factor requires a long time at an initial access to a floppy disk or hard disk. In another exmaple, an object to be accessed has to wait during the input/output operation with other host computer.

By the above reasons, the design of the option board is difficult.

SUMMARY OF THE INVENTION

It is an object of the present invention to provide an input/output device which can inhibit exchange of information with a non-registered interface.

It is another object of the present invention to provide an interface board which performs a function of interface after it has sent identification data to a main unit and received a response thereto.

DETAILED DESCRIPTION OF THE PREFERRED EMBODIMENTS

The present invention is now explained in detail with reference to the drawings.

Figure 1:
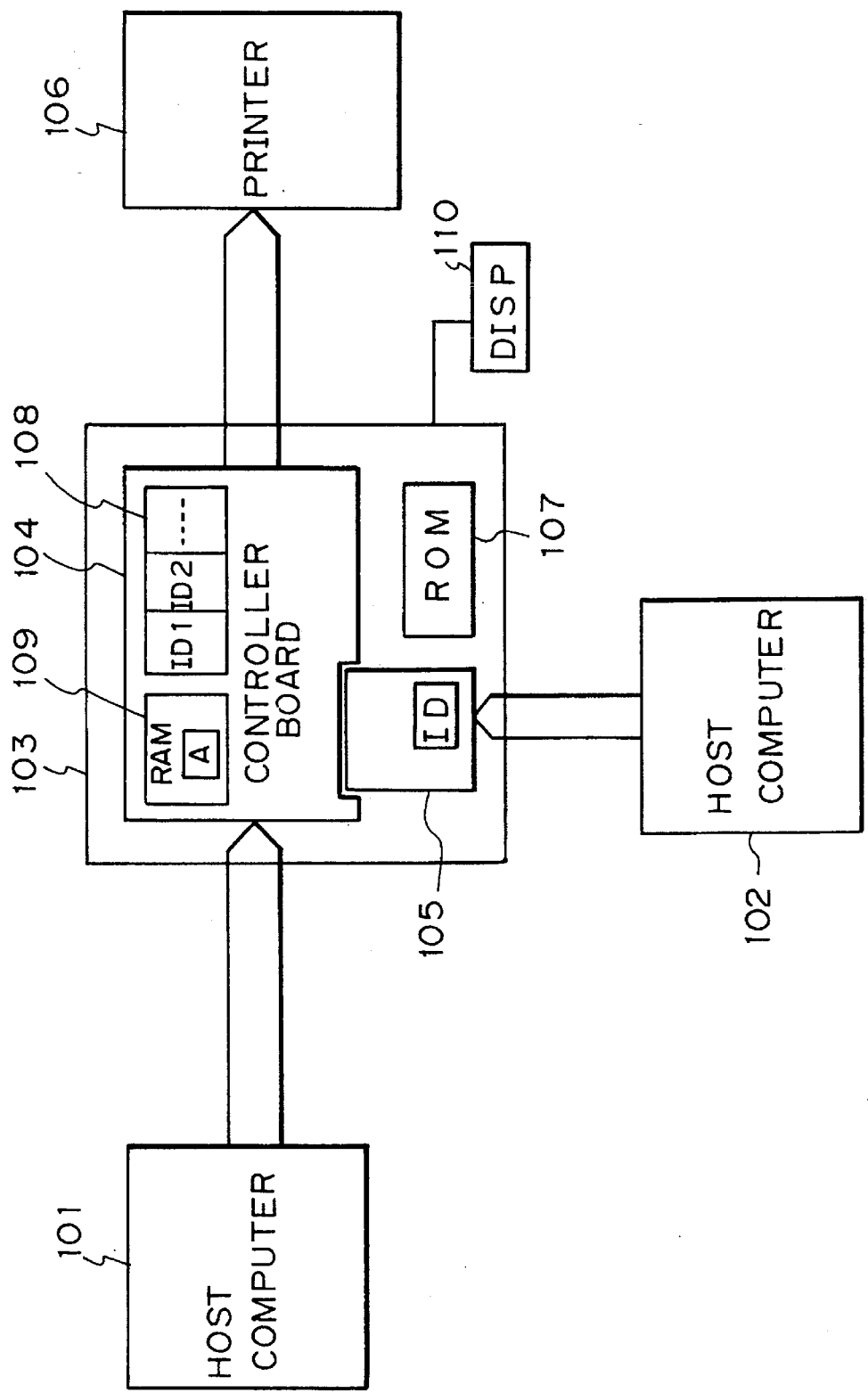
FIG. 1 shows a block diagram of one embodiment of the present invention.

FIG. 1 shows a block diagram of a system configuration of one embodiment of the present invention. Numerals 101 and 102 denote equipment such as host computers which output text information. Numeral 103 denotes a data input/output device, numeral 104 denotes a controller board which controls the overall system, numeral 105 denotes an expansion interface board which is an option board removably loaded to the input/output device 103, numeral 106 denotes a printer which receives dot information from the data input/output device 103 to print it out, numeral 107 denotes a read-only memory (ROM) which stores a control program shown in flow charts of FIGS. 2 and 3, and numeral 110 denotes a display which displays a status of the data input/output device.

The operation of the system is described. The data input/output device 103 determines which one of the host computers 101 and 102 it is to receive information from. The text information supplied from the host computer 101 or 102 includes command information indicating a character position and a character size in one page of print sheet, and a character data code such as ASCII code. Those information and code are converted to dot information by accessing a font memory in the controller board 104 provided in the data input/output device 103, and the dot information is printed out by the printer 106.

In the data input/output device 103 described above, the option board 105 may or may not be loaded. Accordingly, the expansion interface board 105 is detected in a procedure shown in FIG. 2.

Figure 2:
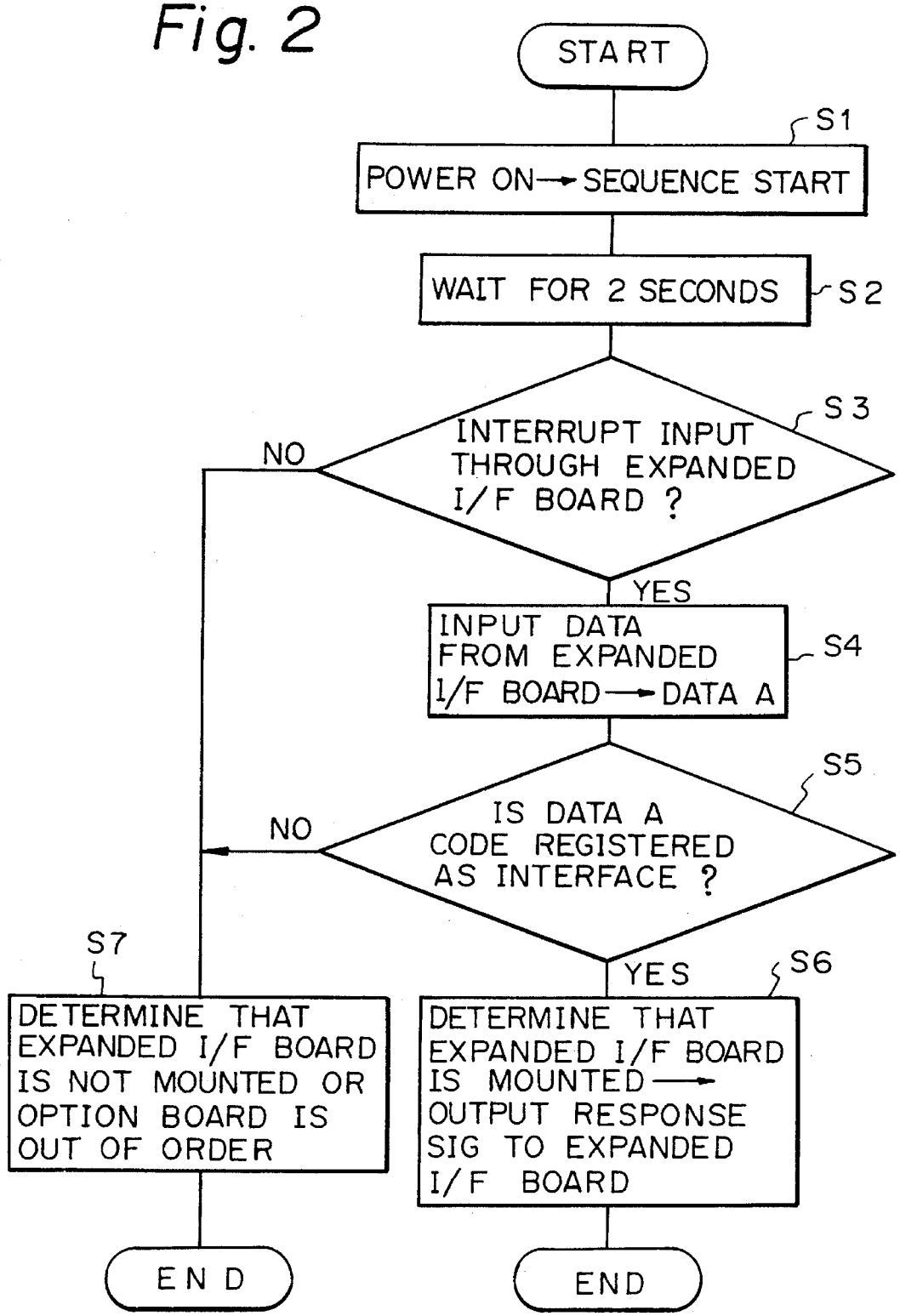
FIG. 2 shows a flow chart of an operation of a controller board in the embodiment of the present invention.

FIG. 2 shows a flow chart of the operation of the controller board 104. When the data input/output device 103 is powered on, the controller board 104 and the expansion interface board 105 are reset (step S1).

The controller board 104 stands by for two seconds after the power-on (step S2) in view of a time required for a reset sequence of the expansion interface board 105 upon the power on.

The expansion interface board 105 produces an interrupt signal within two seconds from the power-on. After the two second period, the controller board 104 checks if the interrupt input has been issued by the expansion interface board 105 which is the option board (step S3).

If the interrupt signal has not been issued by the expansion interface board 105 in the two-second period, the controller board 104 determines that the expansion interface board 105 which is the option board is in failure or the option board has not been loaded (step S7).

When the controller board 104 receives the interrupt signal from the expansion interface board 105, it receives from the data bus a code indicating the type of interface of the option board. The code is, for example, "40" for an RS-232-C interface, and "8F" for a parallel interface. The data is stored in a register ID in the interface board 105. The data A is supplied from the expansion interface board 105 to the controller board 104 and it is stored in the register 109 (step S4). Whether the data A is a code registered as the interface or not is checked by referencing the registered code stored in the register 108 (step S5).

If the code is not the registered code, it means the failure of the option board and it is displayed on the display 110, and no further exchange of data with the option board is done (step S7).

In the step S5, if the code supplied from the option board is the registered code, either the standard interface or the interface from the option board is selected for inputting to the host computer. Since it is not directly pertinent to the present invention, the explanation is omitted.

If the code supplied from the expansion interface board 105 to the controller board 104 is the registered code, that is, if it is determined that the expansion interface board 105 has been loaded, a response signal is supplied from the controller board 104 to the expansion interface board 105 (step S6). On the other hand, the expansion interface board 105 which is the option board operates in accordance with a flow chart shown in FIG. 3.

Figure 3:
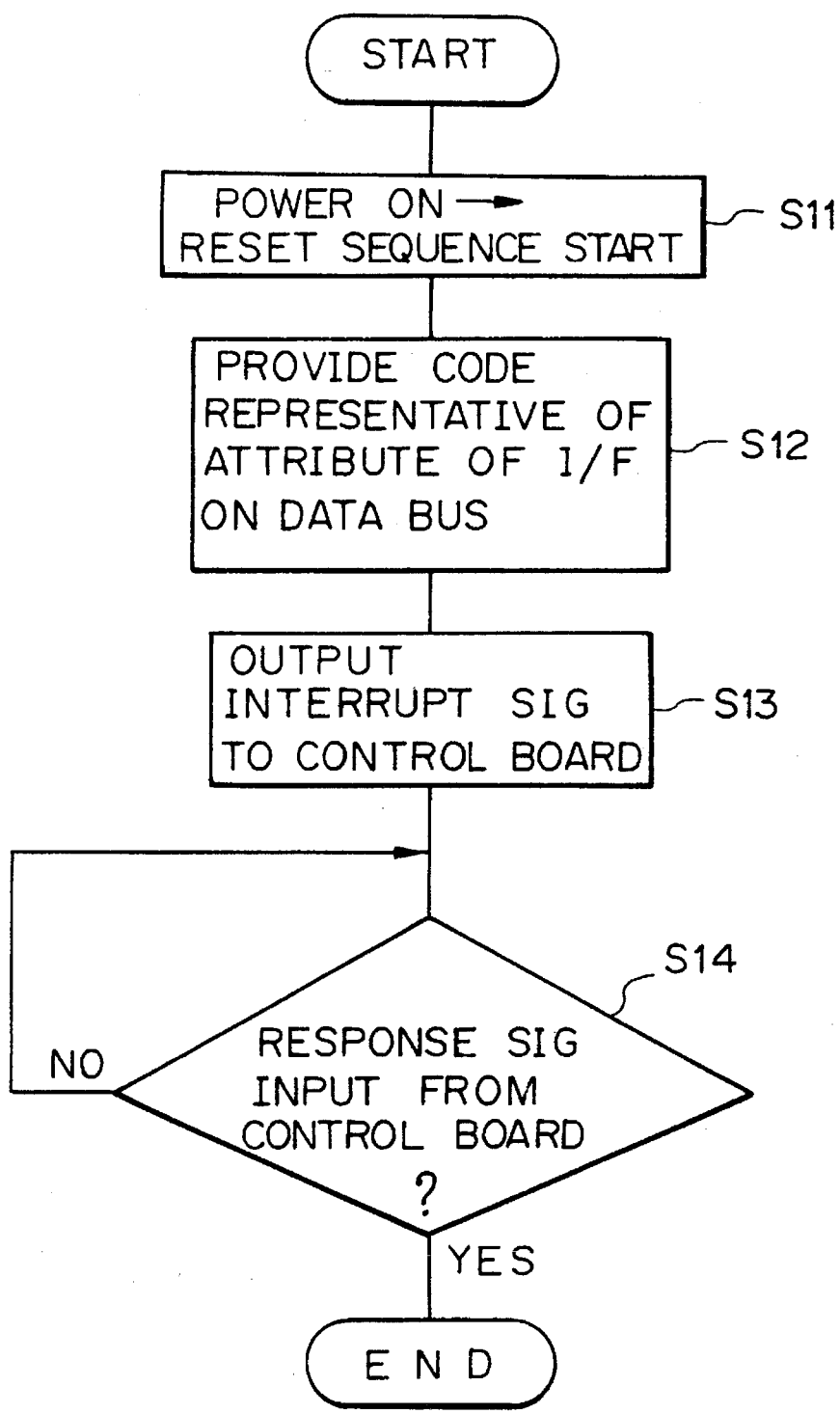
FIG. 3 shows a flow chart of an operation of an expassion interface board in the embodiment of the present invention.

FIG. 3 shows the flow chart of the operation of the expansion interface board. When the power supply is turned on, the expansion interface board is reset (step S11).

Then, a code indicating the type of interface is output to the data bus (step S12). At the same time, an interrupt signal is output to the controller board 104 (step S13).

After the interrupt signal has been output, the expansion interface board 105 waits for a response signal from the controller board 104. Until the response signal from the controller board 104 is received, the expansion interface board 105 does not accept the data supplied from the text information output device 102 (step S14).

One embodiment of the present invention has been described above. If the input/output data after the power-on is encrypted, it is possible to inhibit the use of an interface other than an authorized interface even if it has an electrically equivalent function. Thus, an unreliable interface board such as an unauthorized interface board can be eliminated.

Whether the standard interface or the option interface is to be selected as the input interface of the data input/output device can be set by a console panel of the data input/output device. Thus, if the option board has not been loaded or the option board loaded has a different interface than the specified one, an error may be indicated. Immediately after the power-on, the interrupt signal and the type of interface are supplied from the option board to the controller board.

In accordance with the present invention, the signal for specifying the type of interface means is sent from the transmission means to the discrimination means. Accordingly, a detection line for the expansion interface board is not necessary. As a result, an additional address line may be used.

When the expansion interface board does not function, the interrupt signal from the board is not supplied to the controller. Accordingly, the hang-up of the controller due to waiting for the response is prevented.

I claim:

1. Printer interface apparatus for inputting input data from an external apparatus and for outputting output data generated from the input data to a print out apparatus, the output data having a format different from that of the input data, said printer interface apparatus comprising:

load means for detachably loading a detachable interface device, wherein said printer interface apparatus inputs the input data through a loaded interface device loaded in said load means;

discrimination means, responsive to identification information received from the loaded interface device, for discriminating a type of the loaded interface device and for determining whether or not the type of the loaded interface device is authorized; and output means, responsive to a determination by said discrimination means that the type of the loaded interface device is authorized, for outputting a response signal to the loaded interface device, wherein said discrimination means determines that the type of the loaded interface device is authorized when the type of the loaded interface device identifies the loaded interface device as being responsive to the response signal to accept input of the input data from the external apparatus and further being operative in an absence of the response signal to not accept input of the input data from the external apparatus.

2. Printer interface apparatus according to claim 1, wherein the external apparatus is a host computer.

3. Printer interface apparatus according to claim 1, wherein said printer interface apparatus generates dot data from the input data.

4. Printer interface apparatus according to claim 1, wherein the input data comprises character code data and command data.

5. Printer interface apparatus for inputting input data from an external apparatus and for outputting output data generated from the input data to a print out apparatus, the output data having a format different from that of the input data, said printer interface apparatus comprising:

load means for detachably loading a detachable interface device, wherein said printer interface apparatus inputs the input data through a loaded interface device loaded in said load means;

discrimination means, responsive to identification information received from the loaded interface device, for discriminating a type of the loaded interface device and for determining whether or not the type of the loaded interface device is authorized; and output means, responsive to a determination by said discrimination means that the type of the loaded interface device is authorized, for outputting a response signal to the loaded interface device, wherein said discrimination means determines that the type of the loaded interface device is authorized when the type of the loaded interface device identifies the loaded interface device as being responsive after receipt of the response signal to accept input of the input data from the external apparatus.

6. Printer interface apparatus according to claim 5, wherein the external apparatus is a host computer.

7. Printer interface apparatus according to claim 5, wherein said printer interface apparatus generates dot data from the input data.

8. Printer interface apparatus according to claim 5, wherein the input data comprises character code data and command data.

9. A printer interface method for inputting input data from an external apparatus and for outputting output data generated from the input data to a print out apparatus, the output data having a format different from that of the input data, said printer interface method comprising the steps of:

detachably loading a detachable interface device, wherein said method inputs the input data through a loaded interface device;

responsive to identification information received from the loaded interface device, discriminating a type of the loaded interface device and determining whether or not the type of the loaded interface device is authorized; and responsive to a determination by said discriminating step that the type of the loaded interface device is authorized, outputting a response signal to the loaded interface device, wherein said discriminating step determines that the type of the loaded interface device is authorized when the type of the loaded interface device identifies the loaded interface device as being responsive to the response signal to accept input of the input data from the external apparatus and further being operative in an absence of the response signal to not accept input of the input data from the external apparatus.

10. A method according to claim 9, wherein the external apparatus is a host computer.

11. A method according to claim 9, wherein the input data comprises character code data and command data.

12. A method for inputting input data from an external apparatus and for outputting output data generated from the input data to a print out apparatus, the output data having a format different from that of the input data, said printer interface method comprising the steps of:

detachably loading a detachable interface device, wherein said method inputs the input data through a loaded interface device;

responsive to identification information received from the loaded interface device, discriminating a type of the loaded interface device and determining whether or not the type of the loaded interface device is authorized; and responsive to a determination by said discriminating step that the type of the loaded interface device is authorized, outputting a response signal to the loaded interface device, wherein said discriminating step determines that the type of the loaded interface device is authorized when the type of the loaded interface device identifies the loaded interface device as being responsive after receipt of the response signal to accept input of the input data from the external apparatus.

13. A method according to claim 12, wherein the external apparatus is a host computer.

14. A method according to claim 12, wherein the input data comprises character code data and command data.

15. A data carrying medium conveying instructions for a programmable processing apparatus such that, when loaded into the processing apparatus, the processing apparatus is programmed to perform a method that controls a printer interface apparatus for inputting input data from an external apparatus and for outputting output data generated from the input data to a print out apparatus, the output data having a format different from that of the input data, the printer interface apparatus comprising load means for detachably loading a detachable interface device, wherein the printer interface apparatus inputs the input data through a loaded interface device loaded in the load means, said method comprising the steps of:

responsive to identification information received from the loaded interface device, discriminating a type of the loaded interface device and determining whether or not the type of the loaded interface device is authorized; and responsive to a determination by said discriminating step that the type of the loaded interface device is authorized, outputting a response signal to the loaded interface device, wherein said discriminating step determines that the type of the loaded interface device is authorized when the type of the loaded interface device identifies the loaded interface device as being responsive to the response signal to accept input of the input data from the external apparatus and further being operative in an absence of the response signal to not accept input of the input data from the external apparatus.

16. A data carrying medium according to claim 15, wherein the external apparatus is a host computer.

17. A data carrying medium according to claim 16, wherein the input data comprises character code data and command data.

18. A data carrying medium conveying instructions for a programmable processing apparatus such that, when loaded into the processing apparatus, the processing apparatus is programmed to perform a method that controls a printer interface apparatus for inputting input data from an external apparatus and for outputting output data generated from the input data to a print out apparatus, the output data having a format different from that of the input data, the printer interface apparatus comprising load means for detachably loading a detachable interface device, wherein the printer interface apparatus inputs the input data through a loaded interface device loaded in the load means, said method comprising the steps of:

responsive to identification information received from the loaded interface device, discriminating a type of the loaded interface device and determining whether or not the type of the loaded interface device is authorized; and responsive to a determination by said discriminating step that the type of the loaded interface device is authorized, outputting a response signal to the loaded interface device, wherein said discrimination means determines that the type of the loaded interface device is authorized when the type of the loaded interface device identifies the loaded interface device as being responsive after receipt of the response signal to accept input of the input data from the external apparatus.

19. A data carrying medium according to claim 18, wherein the external apparatus is a host computer.

20. A data carrying medium according to claim 18, wherein the input data comprises character code data and command data.

\* \* \* \* \*

UNITED STATES PATENT AND TRADEMARK OFFICE
CERTIFICATE OF CORRECTION

PATENT NO.  :  5,564,110
DATED       :  October 8, 1996
INVENTOR(S) :  SHIGERU UEDA It is certified that error appears in the above-identified patent and that said Letters Patent is hereby corrected as shown below:

On the title page, item

AT [63] RELATED U.S. APPLICATION DATA

"Mar. 7, 1989" should read --Mar. 7, 1988--.

COLUMN 2

Line 7, "expassion" should read --expansion--.

Signed and Sealed this

First Day of April, 1997

Attest:

BRUCE LEHMAN

*Attesting Officer*    Commissioner of Patents and Trademarks